G. L. REUSCHLINE.
STUFFING BOX PACKING.
APPLICATION FILED APR. 18, 1914.
1,184,212.
Patented May 23, 1916.
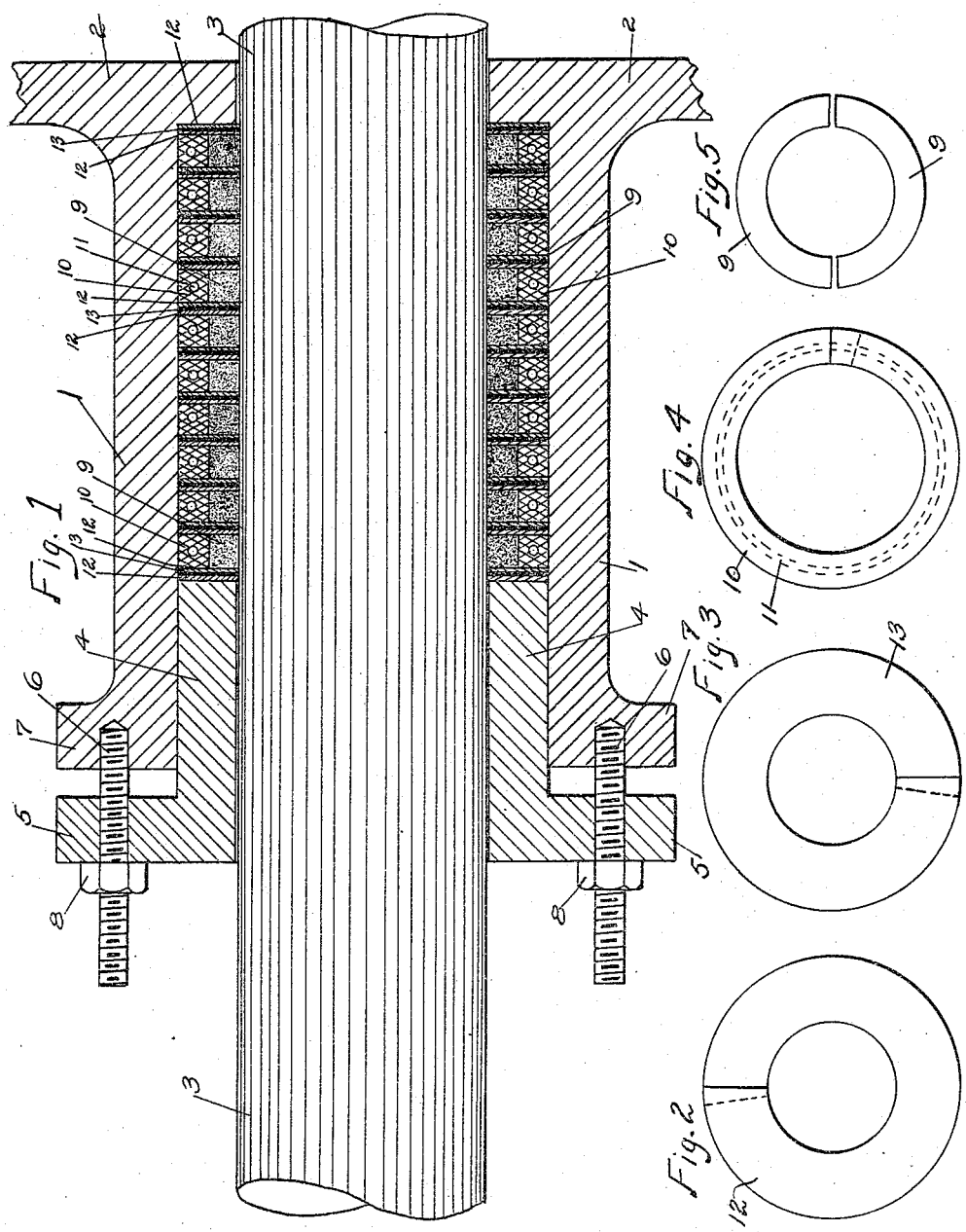
WITNESSES:
INVENTOR
George L. Reuschline
BY
Cornelius L. Ehret
ATTORNEY.

UNITED STATES PATENT OFFICE.

GEORGE L. REUSCHLINE, OF PHILADELPHIA, PENNSYLVANIA.

STUFFING-BOX PACKING.

1,184,212.  Specification of Letters Patent. Patented May 23, 1916.

Application filed April 18, 1914. Serial No. 832,706.

*To all whom it may concern:*

Be it known that I, GEORGE L. REUSCHLINE, a citizen of the United States, residing in Philadelphia, county of Philadelphia, and State of Pennsylvania, have invented new and useful Improvements in Stuffing-Box Packing, of which the following is a specification.

My invention relates to a packing for reciprocating rods, such as piston rods, or for rotary shafts.

It is the object of my invention to provide a packing which will prevent escape of fluid, liquid, gas or vapor from a chamber through a wall of which passes a reciprocating rod or rotary shaft; and it is particularly the object of my invention to provide a packing for such use where the difference in pressure between the interior and the exterior of the chamber is relatively great as, for example, in ammonia compressors used in refrigeration or ice making plants. To these ends I have provided a packing comprising a ring, preferably of anti-friction material, embracing the rod or shaft, with a ring of yielding, resilient or more or less compressible material peripherally or circumferentially surrounding the first named ring, the two rings filling the space between the rod or shaft and the inner wall of the stuffing box; and I preferably use in combination therewith washers or rings extending across the joint between the first named rings and preferably extending from the rod or shaft to the interior wall of the stuffing box.

My invention resides in a packing of the character hereinafter described and claimed.

For an illustration of one of the forms my invention may take reference is to be had to the accompanying drawing, in which:

Figure 1 is a longitudinal sectional view through a stuffing box and gland and through the packing, the shaft or rod being shown in elevation. Figs. 2 and 3 are plan views of rings or washers. Figs. 4 and 5 are plan views of the inner and outer rings respectively.

In Fig. 1, 1 is the stuffing box on the wall 2 of an engine or compressor cylinder or of any other chamber through which wall extends the rod or shaft 3. Extending into the outer end of the stuffing box 1 is the gland 4 through whose lugs 5 extend the studs 6 threaded into the lugs 7 on the stuffing box 1. Nuts 8 serve to advance the gland 4 into the box 1 against the packing.

The structure thus far described is the common and well known structure heretofore commonly used.

A ring 9 surrounds the shaft or rod 3 and consists of any suitable anti-friction material so that there shall be a minimum of friction between the stationary ring 9 and the shaft or rod 3. This anti-friction material may be, for example, of Babbitt metal or any other suitable anti-friction metal. Or it may be a compound, as of anti-friction metal and graphite with a binder such as rubber or Pará gum. The nature of the material of the ring 9 being generally such that it is not easily bent or being brittle or granular, the ring is divided into two parts as indicated in Fig. 5 which parts are placed around the rod or shaft 3 in the position indicated in Figs. 5 and 1. Peripherally or circumferentially surrounding the ring 9 is the ring 10 of material which is compressible or which yields under pressure and which may be more or less resilient. The ring 10 may be cut, as on a slant as indicated in Fig. 4, and the ends spread apart to place the ring in position around the shaft or rod 3 and the inner ring 9 into position indicated in Fig. 1. The ring 10 may be of fibrous material, as cotton or other fabric, such as tick, which may be impregnated with suitable material, for example rubber or gum, or it may be a rubber ring. And the ring 10 may have a hole or core 11 extending circumferentially therethrough. By preference I employ a plurality or a series of pairs of inner and outer rings 9 and 10, as indicated in Fig. 1. And on either or both sides of a pair of rings 9 and 10, or between neighboring pairs of rings, is disposed a ring, which may be relatively thin, like a washer, extending across the joint between the rings 9 and 10 and having a neat fit with the rod or shaft 3 and the interior wall of the stuffing box 1; or I may use a plurality of such rings or washers and I have so indicated them in Fig. 1. In the example illustrated there are two washers 12, as of lead, tin or other suitable metal or other material, between which is disposed a washer or ring 13 preferably of material more or less compressible, or which may be resilient, as for example, rubber, oil proof rubber, or gum.

These washers 12 and 13 are also preferably cut on the slant as indicated in Figs. 2 and 3 so that the ends may be pulled apart to place the rings around the shaft or rod 3.

The gland 4 having been removed, the packing elements may be placed in position as above described in the relation illustrated in Fig. 1. The gland is then entered into the box 1 and by advancing the nuts 8 upon the studs 6 the gland is forced toward the right against the packing. The pressure exerted upon the packing compresses the rings 10, which in the uncompressed state may be thicker longitudinally of the shaft or rod 3 than the rings 9, and these rings 10 then exert a radial pressure throughout the periphery or circumference of the rings 9 forcing the latter snugly against the shaft or rod 3. And the compressible washers 13 are also compressed by this pressure of the gland and the rings or washers 12 fit snugly and tightly against the sides of rings 9 and 10 and neatly against the shaft or rod 3 and the inner wall of the box 1.

A packing of the character above described prevents leakage around or along the shaft or rod 3 even when the difference in pressures within and without the chamber or cylinder is relatively great.

The arrangement described, due to the resiliency of the ring 10, particularly when it is under compression, causes the inner ring 9 to be maintained snugly against the rod or shaft 3 throughout all variations of temperature of the parts, simultaneously maintaining a tight joint between the ring 10 and the inner wall of the stuffing box 1.

I have used this packing in connection with ammonia compressors and as a result leakage of ammonia from within the compressor cylinder is completely prevented, thus affording an economy not only by the saving of ammonia but also from the fact that the engineer or attendant is not required to continually watch the packing and change the pressure of the gland with changing operating conditions within the compressor cylinder.

It will be understood that my invention is not limited to the materials specified for the various packing elements and that materials other than those hereinbefore mentioned may be used.

What I claim is:

1. In a packing, a packing unit comprising an inner ring of substantially incompressible material, an outer ring of compressible material inclosing said inner ring, said outer ring having a hole extending circumferentially thereof, and means for exerting pressure laterally on said outer ring for compressing the same to a thickness not exceeding the thickness of said inner ring, said outer ring solely exerting radial pressure upon said inner ring.

2. In a packing, an inner ring of substantially incompressible material, an outer ring of compressible material surrounding said inner ring and solely exerting thereon radial pressure throughout its circumference, said outer ring having when not under compression a thickness greater than said inner ring, and means for compressing said outer ring to a thickness not exceeding that of said inner ring.

3. In a packing, a packing unit comprising a single inner ring of substantially incompressible material, washers held against the end of said ring and having diameters greater than said ring, and an outer ring of compressible material surrounding said single inner ring and held compressed between said washers to exert radial pressure on said inner ring, said outer ring having space when under compression into which it is further compressed upon expansion of said inner ring, the pressure of said washers on said inner ring producing no radial pressure thereon.

4. In a packing, a packing unit comprising a single inner ring of substantially incompressible anti-friction metal, washers held against the ends of said ring and having diameters greater than said ring, and an outer ring of compressible resilient material surrounding said single inner ring and held compressed between said washers, said outer ring having space when under compression into which it is further compressed upon expansion of said inner ring.

5. In a packing, an inner ring of anti-friction substantially incompressible material, an outer ring of compressible material surrounding said inner ring and solely exerting thereon radial pressure throughout the circumference thereof, said outer ring having when not under compression a thickness greater than said inner ring, and means for compressing said outer ring to a thickness not exceeding that of said inner ring.

6. In a packing, a plurality of packing units disposed side by side and each operative independently of the other in a radial direction, each unit comprising a single inner ring of substantially incompressible material, an outer ring inclosing said inner ring and consisting of compressible resilient material, washers between neighboring units and extending across the joints of the rings of the units, and means for exerting lateral pressure on said units, said pressure producing no radial pressure on said inner rings and compressing said outer rings to exert radial pressure on said inner rings.

7. In a packing, a plurality of packing units disposed side by side and each operative independently of the other in a radial direction, each unit comprising a single inner ring of substantially incompressible material, an outer ring inclosing said inner ring and consisting of compressible resilient material, washers of compressible and incompressible material between neighboring units and extending across joints of the rings of said units, and means for exerting lateral pressure on said units, said pressure producing no radial pressure on said inner rings and compressing said outer rings to exert radial pressure on said inner rings.

8. In a packing, a plurality of packing units disposed side by side and each operative independently of the other in a radial direction, each unit comprising a single inner ring of substantially incompressible material, an outer ring inclosing said inner ring and consisting of compressible resilient material, washers between neighboring units and extending across the joints of the rings of the units, the outer ring of a unit having space into which it may be further compressed upon expansion of the associated inner ring, and means for exerting lateral pressure on said units, said pressure producing no radial pressure on said inner rings and compressing said outer rings to exert radial pressure on said inner rings.

9. In a packing, a plurality of packing units disposed side by side and each operative independently of the other in a radial direction, each unit comprising a single inner ring of substantially incompressible material, an outer ring inclosing said inner ring and consisting of compressible resilient material, washers between neighboring units and extending across the joints of the rings of the units, the outer ring of a unit when not under compression between said washers having a thickness greater than the thickness of the inner ring and having space into which it is further compressed upon expansion of the inner ring, and means for exerting lateral pressure on said units, said pressure producing no radial pressure on said inner rings and compressing said outer rings to exert radial pressure on said inner rings.

10. In a packing, a plurality of packing units disposed side by side and operative independently of each other in a radial direction, each unit comprising a single substantially incompressible inner ring of anti-friction metal and lubricating material, an outer compressible ring of fabric and rubber, washers against the sides of each inner ring and of greater diameter of said inner ring and between which said outer ring is compressed, and means for exerting lateral pressure on said units, said pressure producing no radial pressure on said inner rings and compressing said outer rings to exert radial pressure on said inner rings.

11. In a packing, a packing unit comprising an inner ring of metallic material, an outer ring of compressible material inclosing said inner ring, and means for exerting pressure laterally on said outer ring to compress the same against said inner ring, said outer ring solely exerting only radial pressure upon said inner ring.

In testimony whereof I have hereunto affixed my signature in the presence of the two subscribing witnesses.

GEORGE L. REUSCHLINE.

Witnesses:
CARL J. JEFFERSON,
ALICE S. MARSH.

Copies of this patent may be obtained for five cents each, by addressing the "Commissioner of Patents, Washington, D. C."

It is hereby certified that in Letters Patent No. 1,184,212, granted May 23, 1916, upon the application of George L. Reuschline, of Philadelphia, Pennsylvania, for an improvement in "Stuffing-Box Packing," errors appear in the printed specification as follows: Page 2, line 79, for the word "end" read *ends;* same page, line 97, claim 4, after the word "washers" and before the comma insert the words *to exert radial pressure on said inner ring;* same page and claim, line 100, strike out the period and insert a comma and the words *the pressure of said washers on said inner ring producing no radial pressure thereon.;* page 3, line 4, claim 7, before the word "joints" insert the article *the;* and that the said Letters Patent should be read with these corrections therein that the same may conform to the record of the case in the Patent Office.

Signed and sealed this 13th day of June, A. D., 1916.

[SEAL.] 
R. F. WHITEHEAD,
*Acting Commissioner of Patents.*

Cl. 137—116.